United States Patent

Nakano et al.

[11] Patent Number: 5,845,260
[45] Date of Patent: Dec. 1, 1998

[54] SYSTEM AND METHOD FOR PARENT-CONTROLLED CHARGING FOR ON-LINE SERVICES

[75] Inventors: Hiroaki Nakano; Makoto Niijima; Yumie Sonoda, all of Tokyo; Yoshiaki Kumagai, Kanagawa; Junichi Nagahara, Tokyo; Tatsushi Nashida, Kanagawa, all of Japan

[73] Assignee: Sony Corporation, Tokyo, Japan

[21] Appl. No.: 590,944

[22] Filed: Jan. 24, 1996

[30] Foreign Application Priority Data

Feb. 6, 1995 [JP] Japan .................................... 7-017885

[51] Int. Cl.$^6$ .................................................... G06F 17/60
[52] U.S. Cl. ............................ 705/26; 235/379; 235/380; 235/381; 348/1; 348/3; 348/5.5; 395/200.55; 455/2; 707/9; 707/10
[58] Field of Search ..................................... 235/379, 380, 235/381; 348/1, 3, 5.5; 395/200.55; 455/2; 705/26; 707/9, 10

[56] References Cited

U.S. PATENT DOCUMENTS

| | | | |
|---|---|---|---|
| 4,484,217 | 11/1984 | Block et al. ............................... | 358/84 |
| 4,807,023 | 2/1989 | Bestler et al. ............................. | 358/86 |
| 5,046,157 | 9/1991 | Smith et al. ............................. | 340/309 |
| 5,060,079 | 10/1991 | Rufus-Isaacs ........................... | 358/349 |
| 5,168,372 | 12/1992 | Sweetser ................................. | 358/349 |
| 5,331,353 | 7/1994 | Levenson et al. ....................... | 348/725 |
| 5,485,518 | 1/1996 | Hunter et al. ............................. | 380/20 |
| 5,488,633 | 1/1996 | Jamaleddin et al. .................... | 379/201 |
| 5,504,808 | 4/1996 | Hamrick, Jr. ............................ | 379/144 |
| 5,539,450 | 7/1996 | Handelman ............................... | 348/12 |
| 5,629,733 | 5/1997 | Youman et al. ........................... | 348/7 |
| 5,699,104 | 12/1997 | Yoshinobu ................................ | 348/5.5 |

Primary Examiner—Gail O. Hayes
Assistant Examiner—William N. Hughet
Attorney, Agent, or Firm—Jay H. Maioli

[57] ABSTRACT

A charging method for use in an interactive on-line service where a server and terminals of users are mutually connected by a transmission medium, where a predetermined service is provided from the server to the terminals via the transmission medium, and where the fee for such service is collected from each user individually, includes the steps of opening, in the server, an imaginary account for a child of the relevant user with a limited maximum amount, and withdrawing from the imaginary account the fee for the service provided to the user's child. The server can provide a predetermined service to the relevant user's child within a range of the limited maximum amount preset in the imaginary account. When withdrawing the fee from the imaginary account, the server can restrict the service providable to the terminal. Thus, the parent enables his child to receive a desired on-line service, such as on-line shopping or video-on-demand, on the basis of the child's own judgment by setting an upper limit of a service utilizable by the child and still limiting the services providable for the child, hence realizing promoted utilization of the service by children.

10 Claims, 6 Drawing Sheets

SYSTEM AND METHOD FOR PARENT-CONTROLLED CHARGING FOR ON-LINE SERVICES

BACKGROUND OF THE INVENTION

1. Field of the Invention

The present invention relates to a charging method and a charging system adapted for use in interactive on-line service or mail-order sales such as on-line shopping or video-on-demand service.

2. Description of the Related Art

In a conventional charging system where a central server and home television receivers are mutually connected by means of a cable and the server distributes video or data to the television receivers and charges each user individually for the service offered, it is generally customary that the charging process is executed by utilizing the user's credit card. In this case, the user acknowledges the charge by inputting the number of his credit card every time a service is received. Then the service provider company receives the fee from a credit company, and the credit company mails a bill with a detailed account to the actual user to thereby demand payment of the fee.

Thus, in the conventional charging system, any person other than the owner of a credit card is unable to receive the provision of a service. Since children under age do not have a credit card in general, there exists a problem that a child is incapable alone of receiving a service.

In an attempt to solve the above problem, there may be contrived an idea of giving general credit cards to children as well. However, this idea is considered unpractical under the present circumstances where a credit card is usable similarly to cash. Meanwhile in a situation where any child is permitted to use his parent's credit card, it may probably occur that some unnecessary charge is demanded of the parent. Consequently, whenever the child wants to receive a certain service, the parent is obliged to input the number of his credit card each time to approve provision of the service, and therefore it follows that the child is not allowed to receive the desired service unless the parent is always with the child, hence raising an issue that the child's independence is impeded.

On the other hand, as viewed from the service provider company, there exists a problem of probable failure in promoting utilization of the service by children.

SUMMARY OF THE INVENTION

It is an object of the present invention to enable a child to receive a desired on-line service on the basis of his own judgment by setting an upper limit of a service utilizable by children and still limiting the services providable for children, hence realizing promoted utilization of the service by children.

According to a first aspect of the present invention, there is provided a charging method in interactive on-line service where a server and terminals of users are mutually connected by means of a transmission medium, and a predetermined service is provided from the server to the terminals via the transmission medium, and the fee for such service is collected from each user individually. This charging method comprises the steps of opening, in the server, an imaginary account for a child of the relevant user with a limited maximum amount, and withdrawing from the imaginary account the fee for the service provided to the user's child.

The server can provide a predetermined service to the relevant user's child within a range of the limited maximum amount preset in the imaginary account.

And when withdrawing the fee from the imaginary account, the server can restrict the service providable to the terminal.

According to a second aspect of the present invention, there is provided a charging system in interactive on-line service where a server and terminals of users are mutually connected by means of a transmission medium, and a predetermined service is provided from the server to the terminals via the transmission medium, and the fee for such service is collected from each user individually. This charging system comprises a setting means for setting an imaginary account of each user's child with a limited maximum amount, and a charging means for withdrawing from the imaginary account the fee for the service provided to the relevant user's child.

The server can provide a predetermined service to the relevant user's child within a range of the limited maximum amount preset in the imaginary account.

And when withdrawing the fee from the imaginary account, the server can restrict the service providable to the terminal.

In the charging method or the charging system of the present invention where an imaginary account of each user's child is opened in the server, the fee for the service provided to the relevant user's child is withdrawn from the imaginary account. Therefore the charging mode is changeable in accordance with the serviced user.

In one modified charging method or system of the present invention, a child is permitted to receive provision of a predetermined service within the limited maximum amount preset in the imaginary account, so that it is possible to prevent any excessive utilization of the service by the child.

And in another modified charging method or system of the present invention, the service to be provided is restricted when the fee is withdrawn from the imaginary account. Consequently, it becomes possible to restrict provision of any service that is not suited for participation of children.

The above and other features and advantages of the present invention will become apparent from the following description which will be given with reference to the illustrative accompanying drawings.

DESCRIPTION OF THE PREFERRED EMBODIMENTS

Figure 1:
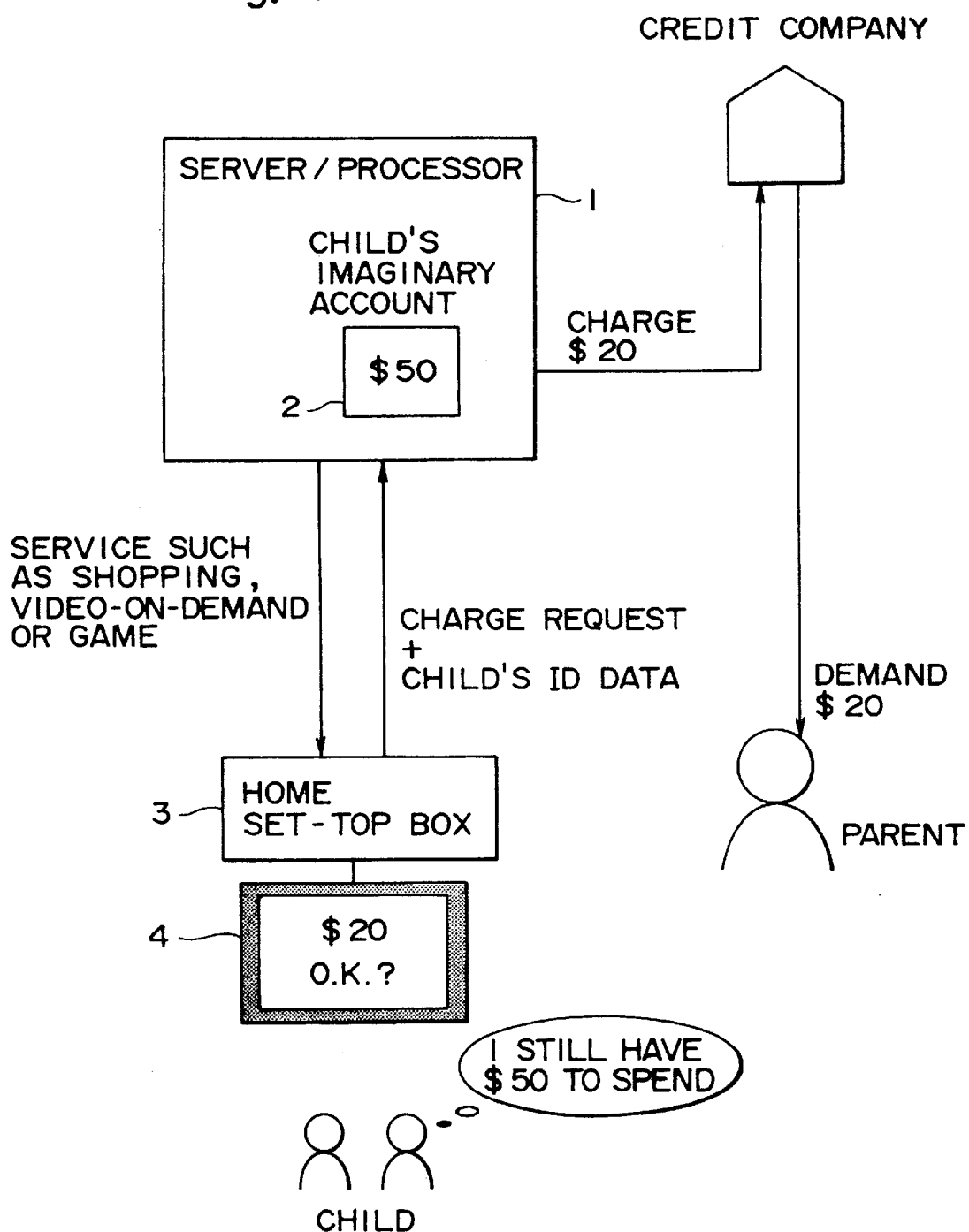
FIG. 1 shows a constitution of an exemplary embodiment representing the charging system of the present invention.
Figure 2:
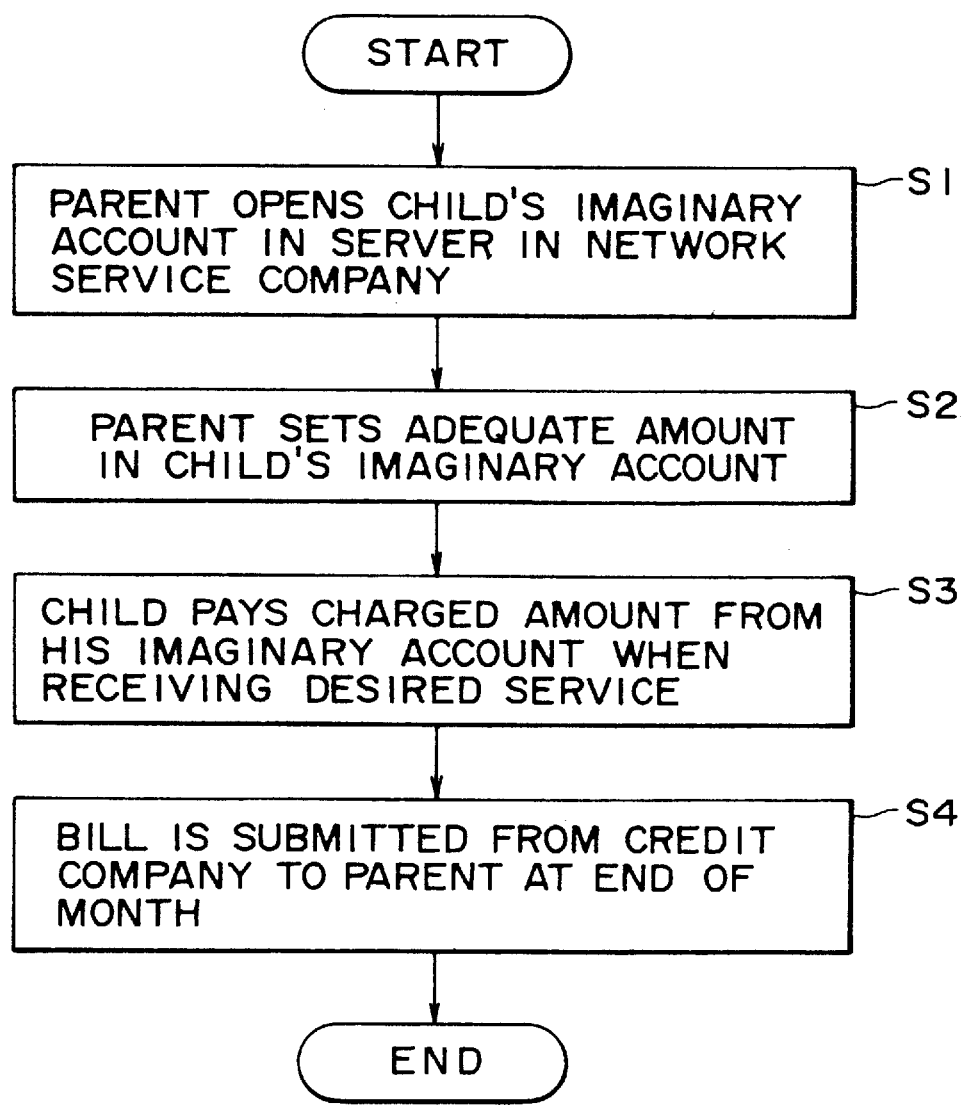
FIG. 2 is a flow chart showing a flow of equivalents in the constitution of FIG. 1.

FIG. 1 shows a constitution of an exemplary embodiment which represents the charging system of the present invention, and FIG. 2 shows a flow of equivalents in the constitution thereof. First at step S1, a parent sets an imaginary account 2, which is to be used exclusively for charging his child, in a server/processor 1 (setting means, charging means) installed in a network service company. As will be described later with reference to FIG. 2, the server/processor 1 consists of a server (data base) 1a and a management computer 1b. Next at step S2, an adequate amount is preset in the charging imaginary account 2. Suppose now that an amount of $50 is preset in the imaginary account 2.

Subsequently at step S3, the child operates a display device 4 such as a television receiver (hereinafter referred to as TV) and transmits a charge request for a desired service to be received, such as on-line shopping, video-on-demand or game, to the server and processor 1 via a set-top box 3. And simultaneously the child's identification data is also transmitted with the charge request. As a result, the fee for the desired service relative to the charge request is withdrawn from the child's imaginary account 2 preset in the server/processor 1.

In case the fee for the desired service relative to the child's charge request is $20, for example, an amount of $20 is withdrawn from the current balance $50 in the imaginary account 2, whereby the balance is reduced to $30. And at the end of each month, the service provider company submits a bill of the total amount ($20 in this example) during the month to a credit company as a credit for the parent.

Thereafter at step S4, the credit company sends a detailed statement and a bill to the parent at the end of the month to thereby claim payment of the total fee ($20 in this case) in that month. The present situation regarding utilization of the service can be checked by inquiring at the server/processor 1 without the necessity of waiting for arrival of the detailed statement from the credit company.

Figure 3:
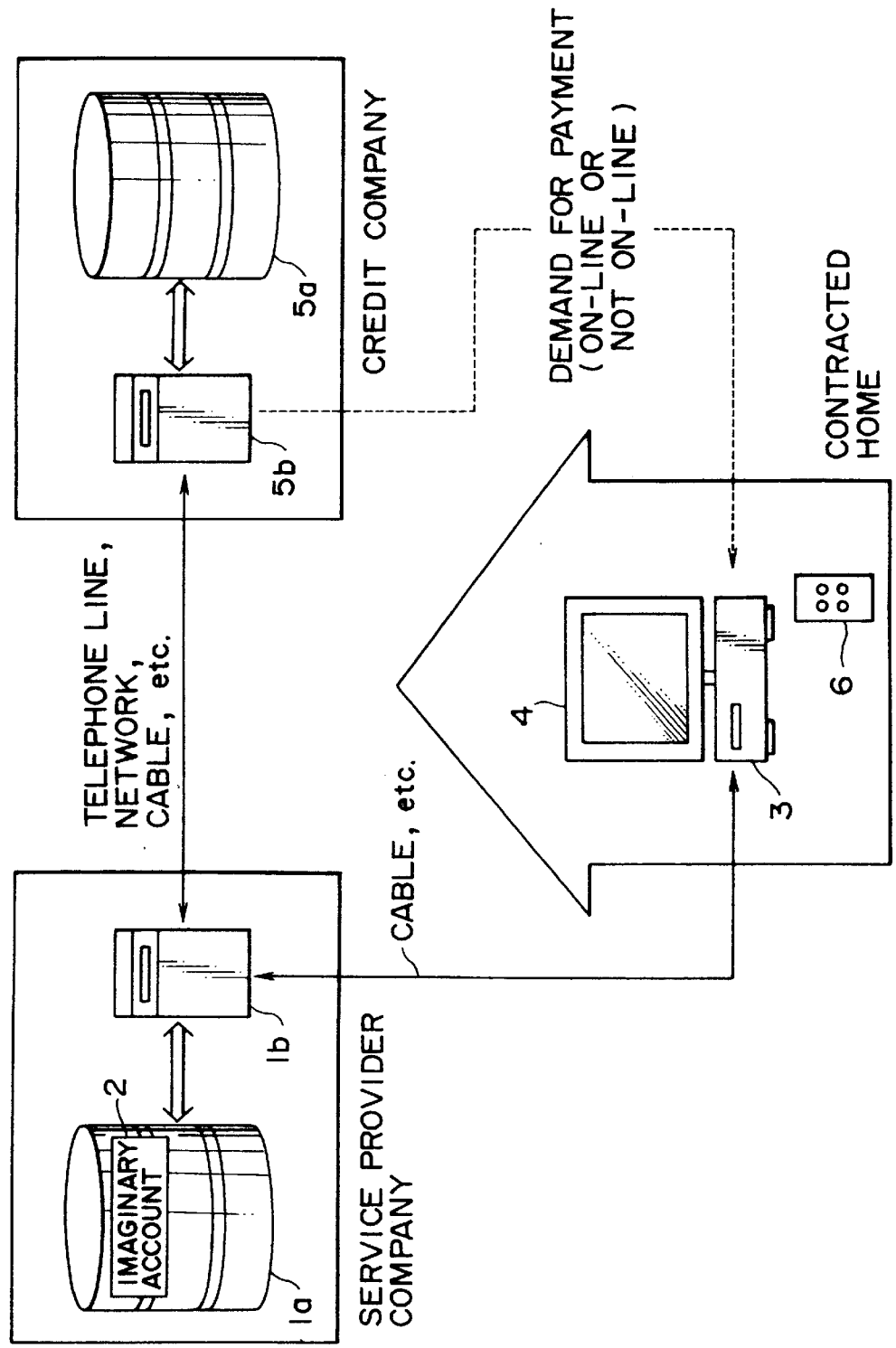
FIG. 3 is a block diagram showing a detailed constitution of the charging system in FIG. 1.

FIG. 3 is a block diagram showing the charging system of FIG. 1 in further detail. The set-top box 3 installed in each contractor home transmits or receives data to or from a service provider company via a cable or the like and supplies the received predetermined data to the display device 4 such as a TV, or transmits to the service provider company a signal which corresponds to a predetermined command obtained by manipulation of a remote described hereinafter.

The display device 4 is capable of displaying characters, patterns or pictures corresponding to predetermined data supplied from the set-top box 3. The remote controller 6 outputs a predetermined command to the set-top box 3 for selecting a desired service such as a game program to be transmitted from the service provider company, or for approving the charge.

In the server (data base) 1a of the service provider company, an imaginary account 2 of the contracted user's child is opened, and there are recorded data of the user inclusive of his credit card number and so forth specified at the time of contract. The management computer 1b transmits or receives predetermined data to or from the set-top box 3 installed in each contractor home for updating the balance of the imaginary account 2 opened in the server 1a, or for reading out some other data therefrom or writing predetermined data therein. Further the computer 1b is capable of transmitting or receiving other data such as charge data to or from the credit company via a telephone line, network or cable.

In a server (data base) 5a of the credit company, various data inclusive of users names, addresses and so forth are recorded. In response to an inquiry or a charge request based on a predetermined credit card number from the service provider company, a management computer 5b retrieves from the server 5a the user's name and address corresponding to the relevant credit card number, and sends a bill to the address. In case the credit company and the contractor home are mutually connected via a telephone line, network or cable, it is possible to execute an on-line demand for payment.

For example, when a desired service such as a movie is selected by manipulating the remote controller 6 in a contractor home and a purchase of the relevant service is commanded, this command is supplied from the set-top box 3 via the cable to the service provider company. At this time, the set-top box 3 supplies also an inherent user ID simultaneously to the service provider company. Then the service provider company recognizes a purchase demand of the desired service by a predetermined user who is identified by the user ID.

In the service provider company, the credit card number stored corresponding to the user ID, which is supplied from the contractor home, in advance at the time of contract, is retrieved from the server 1a, and an inquiry and a charge request are executed to the credit company via a network or the like. And a desired service demanded for purchase, i.e., a movie in this example, is transmitted via a cable to the contractor home.

In the credit company, the fee for the service is demanded to the user in response to the charge request from the service provider company, while the fee for the service is paid to the service provider company. As described above, a demand for payment of the fee to the user is executed by mailing a bill or by on-line transmission of the necessary data in case the credit company and the contractor home are mutually connected via a telephone line or the like.

In the case of an access by a child, it is regarded as a partial charge to his parent and is so processed in the credit company. More specifically, the imaginary account 2 of the child opened in the service provider company is set actually in his parent's account, so that the fee withdrawn from the child's imaginary account 2 is withdrawn actually from his parent's account.

For the purpose of enabling the server/processor 1 to recognize an access by a child, it is possible to devise the system in such a manner that a child needs to input a predetermined code number when making a charge request, or that a remote controller is prepared to be used exclusively by the child and, when a desired service is selected or a charge request is made by manipulating such a remote controller, it is regarded as an access by the child, and then predetermined identification data of the child is transmitted from the set-top box 3 to the server/processor 1. Consequently, the server/processor 1 is capable of recognizing whether the accessing user is a child or not.

Figure 4:
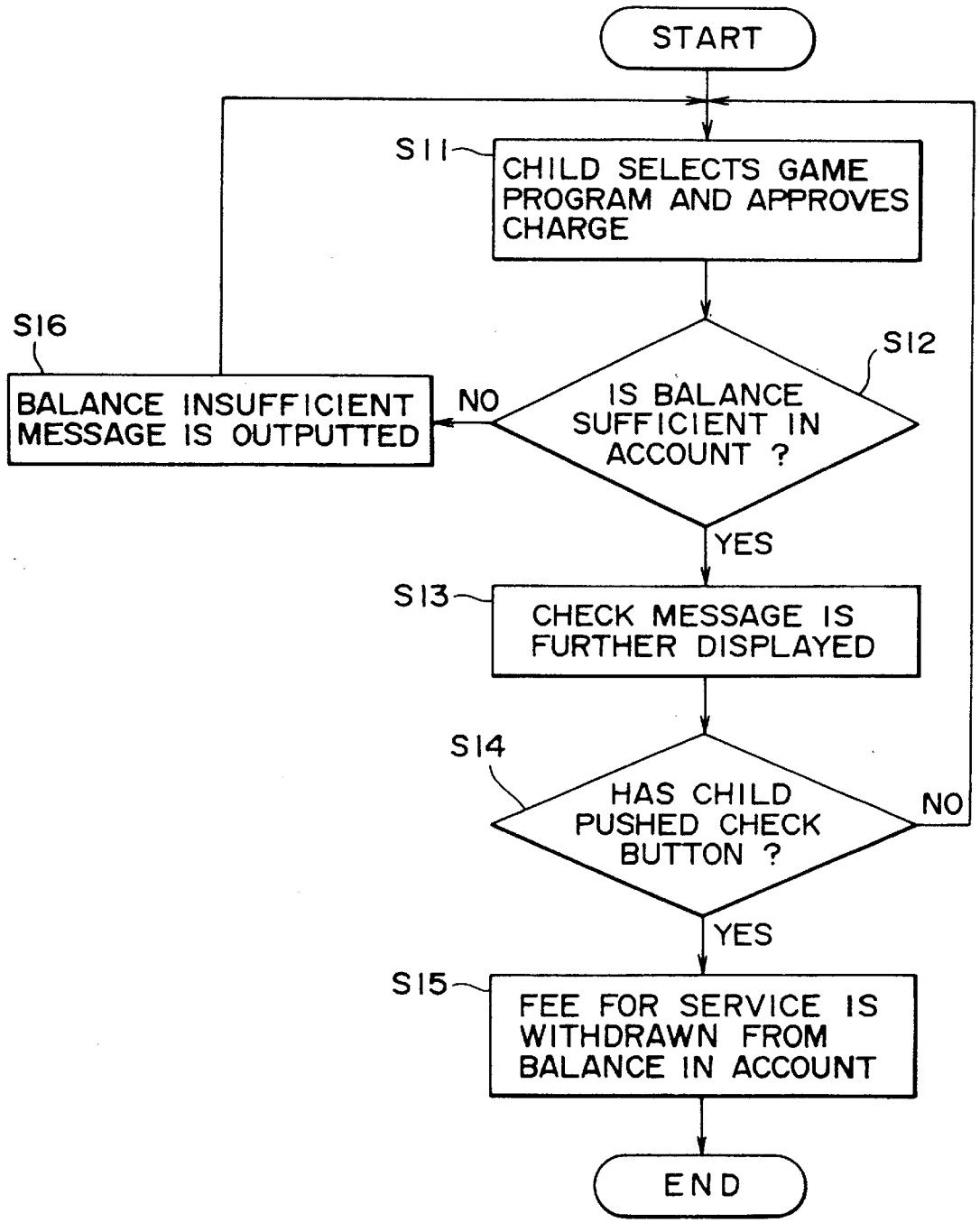
FIG. 4 is a flow chart showing an example of a charging process executed when a child is serviced with a game program.

FIG. 4 is a flow chart for explaining the detailed operation of the charging system performed when a child is serviced with a game. First at step S11, a child selects a desired game program by manipulating the TV 4 or the remote controller 6, and approves a charge for the fee. Then the identification number of the selected game program and a charge request thereof are transmitted from the set-top box 3 via a predetermined cable to the server/processor 1.

Subsequently the operation proceeds to step S12, where the server/processor 1 recognizes a charge to the service requested by the child, i.e., a game program in this case, and makes a decision as to whether the fee for the requested service is less than or equal to the balance in the child's imaginary account 2, that is, whether the balance in the imaginary account 2 is sufficient or not. And if the result of such a decision signifies that the balance in the child's imaginary account 2 is insufficient for the fee of the game program, the operation proceeds to step S16 where a message indicating insufficiency of the balance is displayed on the screen of the TV 4. Then the operation returns to step S11, and the steps subsequent there to are repeated.

Mean while, if the result of the above decision signifies that the balance in the child's account 2 is sufficient for the fee of the game program, the operation proceeds to step S13, where a check message of confirmation is further displayed on the screen of the TV 4 for example.

Thereafter the operation proceeds to step S14, where the server/processor 1 makes a decision as to whether the child has pushed the check button or not. More specifically, when the child has pushed the check button provided for confirmation on the TV 4 or the remote controller 6 while watching the check message displayed on the screen of the TV 4 at step S13, then a corresponding signal is transmitted from the set-top box 3 via a cable or the like to the server/processor 1, so that the above decision is made in accordance with this signal.

If the result of the decision at step S14 signifies that the child has not pushed the check button, the operation returns to step S11, and the steps subsequent thereto are repeated. Meanwhile, if the result of the above decision signifies that the child has pushed the check button, the operation proceeds to step S15 where the fee for the service is withdrawn from the imaginary account 2, and the entire process is completed.

In the fee charging process to the child in this embodiment, it is not necessary for the child to input any credit card number differently from the usual case where a parent receives a service. Accordingly, there is no method of ascertaining if the user is really a regular customer or not. However, the amount is not much since the account is an imaginary one for charging a child and, considering an advance approval of the parent who is an actual owner of the credit card, a simpler means has been selected for convenient utilization of any service by the child. If this selection raises a problem, a modification can be achieved with ease to further enhance the safety by necessitating the child to input a code number.

Figure 5:
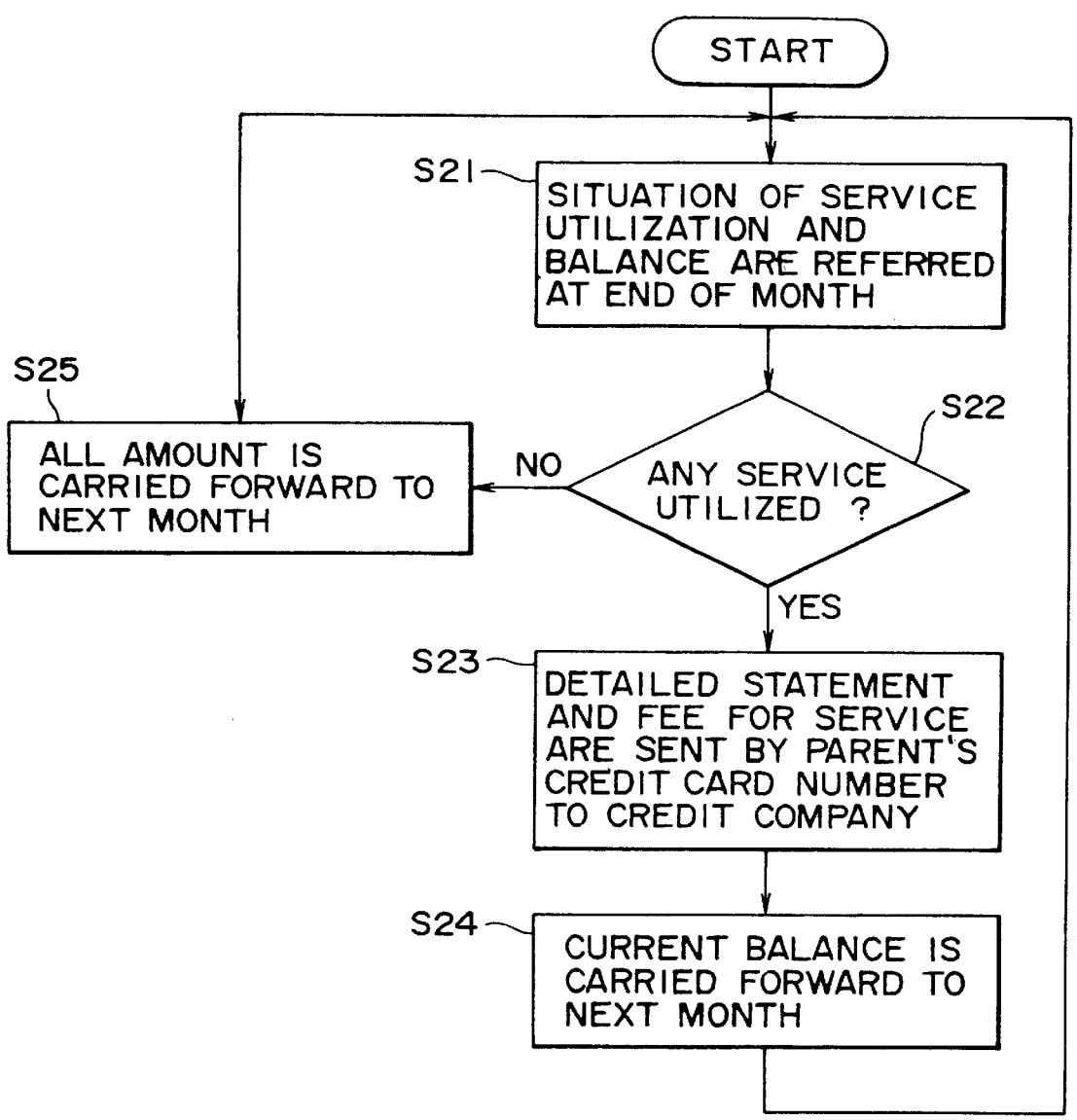
FIG. 5 is a flow chart showing an example of a process executed on a closing day of a month in a service provider company.

FIG. 5 is a flow chart for explaining the detailed operation performed in the service provider company. First at step S21, data regarding service utilization and the balance are reported at the end of each month by the server/processor 1. Next at step S22, a decision is made by the server/processor 1 as to whether any service has been utilized or not.

If the result of the above decision is negative to signify no utilization of any service, the operation proceeds to step S25, where the entire balance in the imaginary account 2 is carried forward to the next month. Then the operation returns to step S21, and the steps subsequent thereto are repeated. Meanwhile, if the result of the decision at step S22 is affirmative to signify utilization of some service, the operation proceeds to step S23.

At step S23, a detailed statement of the service and the fee therefor are sent by the parent's credit card number to the credit company.

Then the operation proceeds to step S24, where the current balance in the imaginary account 2 is carried forward to the next month by the server/processor 1. After that, the operation returns to step S21, and the steps subsequent thereto are repeated.

In this case, only the amount used is billed to the card company, and the current balance is carried forward to the next month. It is usual that the balance tends to decrease as the child is provided with a service and pays the fee for the same. However, in an exemplary future case where the child receives a prize by giving a correct answer in a quiz program or the like or by winning in an on-line game, the balance may increase due to transfer of the prize money to the imaginary account 2. Since it is impossible in this system to cash the balance in the imaginary account 2, the prize money is consumed also in a form of on-line shopping or the like, so that the service provider company can acquire a benefit that the cash never flows out therefrom.

Figure 6:
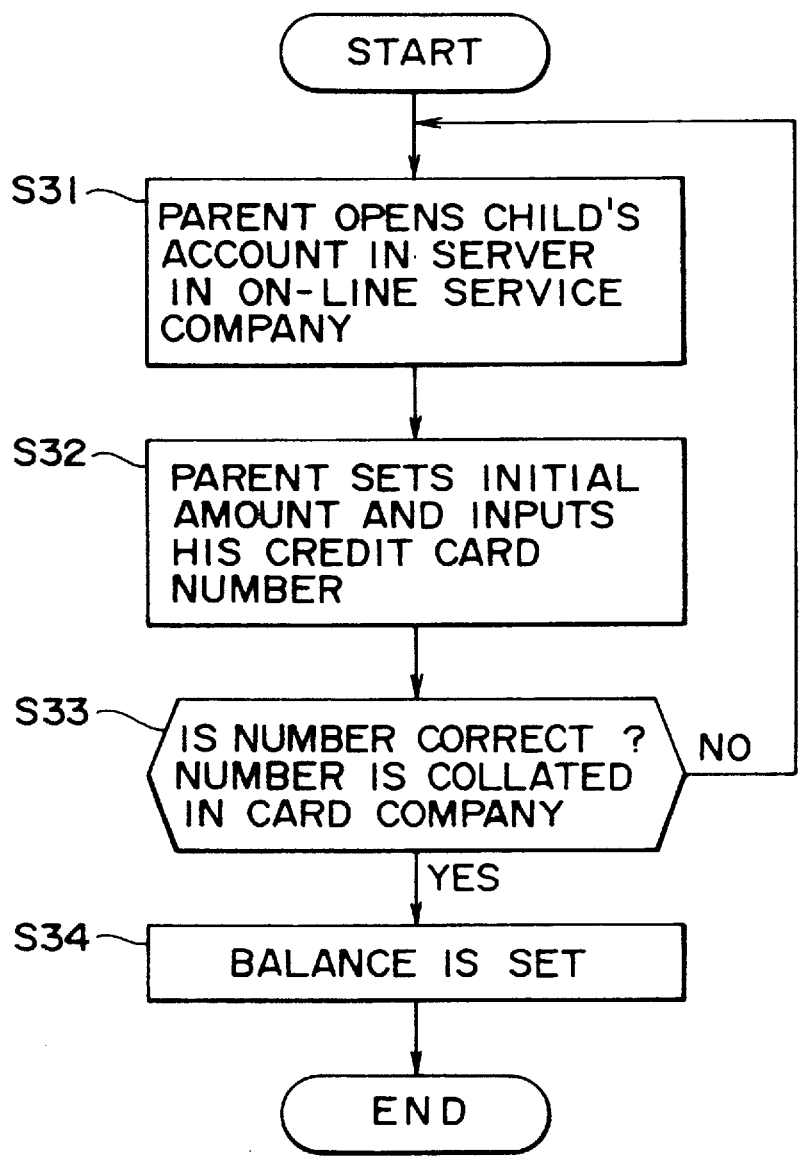
FIG. 6 is a flow chart showing an example of a process executed when a parent sets a balance in his child's imaginary account.

FIG. 6 is a flow chart for explaining the operation performed when a parent sets a balance in a child's imaginary account 2. Initially at step S31, the parent opens the child's imaginary account 2 in the server/processor 1 in the service provider company.

Then the operation proceeds to step S32, where the parent inputs an initial amount to be preset in the imaginary account 2 and further inputs his credit card number. Subsequently the operation proceeds to step S33, where the server/processor 1 inquires of the corresponding card company to verify that the input card number is valid for that customer. And if the result of such a verification signifies that the inputted credit card number is not correct, the operation returns to step S31 and the steps subsequent thereto are repeated. Meanwhile, if the result of the above verification signifies that the inputted credit card number is correct, the operation proceeds to step S34.

Then at step S34, the balance of the amount inputted at step S32 is set in the imaginary account 2.

The processing flow for opening a new imaginary account 2 is similar to that for opening a bank account. This idea is derived from a prepaid card such as a telephone card, and the right of spending a fixed amount of money, which is spendable freely by a child, is purchased by his parent in advance using the parent's card number. The service provider company first inquires of the card company to ascertain if the card number is correct or not, then opens an imaginary account 2 and presets a predetermined amount therein.

Thus, in the service for providing information to each home via a cable, telephone line or network as described above, it becomes possible for a parent to easily manage his child's utilization of the information provision type service by opening a child-charging imaginary account in the server/processor 1 in the service provider company.

In an example where a parent opens his child's imaginary account 2 in the server/processor 1 and, in the same manner as to give a cash allowance to the child per month, presets in the account 2 the amount equivalent to the child's monthly spending money, the parent is capable of managing the child's expense money properly so that the child may not spend a large amount carelessly for the selected service, hence realizing prevention of any trouble that results from purchase by the child in mail order or the like, e.g., any trouble relative to purchase of unnecessary commodities or payment therefor.

Meanwhile, as viewed from the service provider company, participation of children to the service can be promoted to consequently increase expectable charging amounts, since the parent opens the above-described imaginary account 2 and presets a predetermined amount therein, whereby the child is permitted to receive a desired service on the basis of his individual judgment even in the absence of the parent in front of the set-top box 3.

Further, any service can be provided in a state where the independence of each child is respected, so that it becomes possible for the child at home to have a quasi-experience of a business transaction extremely similar to a real one.

It is a matter of course that the parent can grasp the contents of the detailed account statement on the basis of the bill sent from the credit company for settlement, and is informed subsequently of the details by receiving from the service provider company the report of the imaginary account 2 in the server/processor 1, without the necessity of waiting for delivery of the detailed account statement.

And due to the construction where the balance of the imaginary account 2 is displayed on the display device 4 such as a television receiver, the child is enabled to be conscious of paying an equivalent amount for the provided service, and this brings about an advantage of increasing the independence of the child.

Opening the child's imaginary account 2 is quite similar to the case of giving a family credit card to the child and limiting the amount of its credit. However, although a general credit card is usable as cash in nearly all business transactions, this electronic imaginary account 2 is totally different therefrom in the point that it is available merely in the world of interactive on-line service such as on-line shopping or video-on-demand.

Therefore, in contrast with the case of a credit card where the situation of service utilization is transmitted with a detailed account statement sent per month, it is possible in the imaginary account to successively monitor the situation with a merit of on-line service. For example, a parent manipulates the TV 4 or the remote controller 6 to transmit a command, which is used for monitoring the situation of service utilization in the imaginary account 2, to the server/processor 1 via the set-top box 3. Then, in response to the command from the TV 4 or the remote controller 6, the server/processor 1 inquires into the status of service utilization in the imaginary account 2 and transmits the result via the set-top box 3 to the TV 4. Consequently, the current status of service utilization in the imaginary account 2 is displayed on the screen of the TV 4. Since the child's imaginary account is thus opened, an application program for enabling the parent to subsequently monitor the child's service utilization can be constructed with ease.

In case a child is permitted to carry an ordinary credit card with him, it is impossible for his parent to limit the place where the child may use the card. According to the present invention, however, the parent is capable of preventing his child's access to any undesirable service by previously restricting some programs which are selectable by the use of the child's imaginary account 2. Consequently, provision of any service or information unsuitable for participation of children can be restricted.

Although in the above embodiment the server/processor 1 and the set-top box 3 are connected mutually via a cable, any other transmission medium such as a telephone line, an optical fiber cable or a network cable may also be employed for the connection.

Further, a monthly withdrawal from the imaginary account in the above embodiment is changeable to be weekly, daily or per service utilization.

Thus, according to the charging method or the charging system of the present invention in interactive on-line service, an imaginary account for a child of the relevant user is opened, and the fee for the service provided to the user's child is withdrawn from the imaginary account. Therefore the charging mode is changeable depending on the person to be provided with the service, whereby the child's utilization of the service is rendered allowable under supervision of the parent. Consequently it becomes possible to promote participation of children to the service to eventually enhance the added value of the service.

In one modification of the charging method or system, the child is permitted to receive provision of desired service within a range of the limited maximum amount preset in the imaginary account, so that any excessive service utilization by the child is rendered preventable to consequently eliminate any excessive charge.

And in another modification, providable service programs are limited at withdrawal of the fee from the imaginary account, so that it becomes possible to restrict provision of any service that is not suited for participation of children, and therefore the content of the service can be changed in accordance with the serviced person.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A charging method for use in an interactive on-line service where a server and terminals of users are mutually connected by means of a transmission medium, where a service is provided from said server to the terminals via the transmission medium, and where a fee for such service is collected from each user individually, said charging method comprising the steps of:

opening, in said server, an imaginary account for a child of the user and assigning a limited maximum amount to the imaginary account;

selecting, by the user's child, a service to be provided;

limiting the selected service to the user's child within a range of the limited maximum amount preset in said imaginary account; and withdrawing from said imaginary account the fee for the selected service provided to the user's child.

2. The charging method according to claim 1, further comprising the steps of:

providing an input code number preset for the user's child;

causing the server to identify an access by the user's child; and withdrawing from said imaginary account the fee for the selected service provided to the user's child.

3. The charging method according to claim 1, further comprising the steps of:

inputting identification data indicative of the child by a manipulation of an exclusive remote control means provided to the user's child;

causing the server to identify an access by the user's child; and withdrawing from said imaginary account the fee for the selected service provided to the user's child.

4. The charging method according to claim 1, wherein the step of withdrawing the fee from said imaginary account further comprises the step of causing the server to restrict the selected service providable to the terminal of the user's child.

5. The charging method according to claim 1, further comprising the steps of:

inputting a request from a user's terminal for status of service utilization in said imaginary account; and causing the server to transmit to said user's terminal data representing the status of service utilization in said imaginary account.

6. A charging system for use in an interactive on-line service wherein a server and terminals of users are mutually connected by means of a transmission medium, a selected service is provided from said server to the terminals via the transmission medium, and a fee for such selected service is collected from each user individually, said charging system comprising:

means for setting an imaginary account of the user's child and assigning a limited maximum amount to the imaginary account;

means for selecting, by the user's child, a service to be provided;

means for providing the selected service to the user's child within a range of the limited maximum amount present in said imaginary account; and means for withdrawing from said imaginary account the fee for the selected service provided to the user's child.

7. The charging system according to claim 6, further comprising:

means for inputting a code number preset for the user's child;

means for causing the server to identify an access by the user's child; and means for withdrawing from said imaginary account the fee for the selected service provided to the user's child.

8. The charging system according to claim 6, further comprising:

means for inputting identification data indicative of the child by a manipulation of an exclusive remote control means provided to the user's child;

means for causing the server to identify an access by the user's child; and means for withdrawing from said imaginary account the fee for the selected service provided to the user's child.

9. The charging system according to claim 6, wherein the means for withdrawing the fee from said imaginary account further comprises means for causing the server to restrict the selected service providable to the terminal of the user's child.

10. The charging system according to claim 6, further comprising:

means for inputting a request from a user's terminal for status of service utilization in said imaginary account; and means for causing the server to transmit to said user's terminal data representing the status of service utilization in said imaginary account.

* * * * *